United States Patent [19]

Das

[11] Patent Number: 4,805,449
[45] Date of Patent: Feb. 21, 1989

[54] APPARATUS AND METHOD FOR MEASURING DIFFERENTIAL PRESSURE WHILE DRILLING

[75] Inventor: Pralay K. Das, Sugar Land, Tex.
[73] Assignee: Anadrill, Inc., Sugar Land, Tex.
[21] Appl. No.: 126,645
[22] Filed: Dec. 1, 1987
[51] Int. Cl.⁴ .................................................. E21B 47/06
[52] U.S. Cl. ........................................ 73/151; 73/726; 73/746; 175/48
[58] Field of Search ................. 175/40, 48; 73/746, 73/714, 151; 338/4

[56] References Cited

U.S. PATENT DOCUMENTS 3,855,857 12/1974 Claycomb .............................. 73/151
4,297,880 11/1981 Berger ..................................... 73/155
4,479,564 10/1984 Tanguy ................................. 181/105

Primary Examiner—Stewart J. Levy
Assistant Examiner—M. Simons
Attorney, Agent, or Firm—Stephen L. Borst; Dave Gordon

[57] ABSTRACT

An apparatus and method for measuring differential pressure of mud internal a drill string and mud in a borehole annulus is disclosed. The apparatus typically comprises: a drill collar having a pressure balancing piston in hydraulic contact with the borehole annulus mud; a shaped cylinder in contact with the mud internal the drill string and supported by the drill collar but attached such that axial forces on the drill collar are not transferred to the shaped cylinder, wherein the shaped cylinder has relatively thicker end portions in contact with the drill collar, and a relatively thinner middle portion such that a gap is formed between the relatively thinner middle portion of the shaped cylinder and the drill collar; a fluid filling the gap and in hydraulic contact with the pressure balancing piston; a plurality of strain gauges axially and circumferentially disposed around the relatively thinner middle portion of the shaped cylinder, wherein the axially disposed strain gauges provide an indication of axial stress and the circumferentially disposed strain gauges provide an indication of hoop stress; and method for obtaining at least one axial and hoop stress measurement from the plurality of strain gauges, for taking the difference between hoop and axial measurements, and for providing a pressure determination representing the difference of mud pressure.

23 Claims, 2 Drawing Sheets

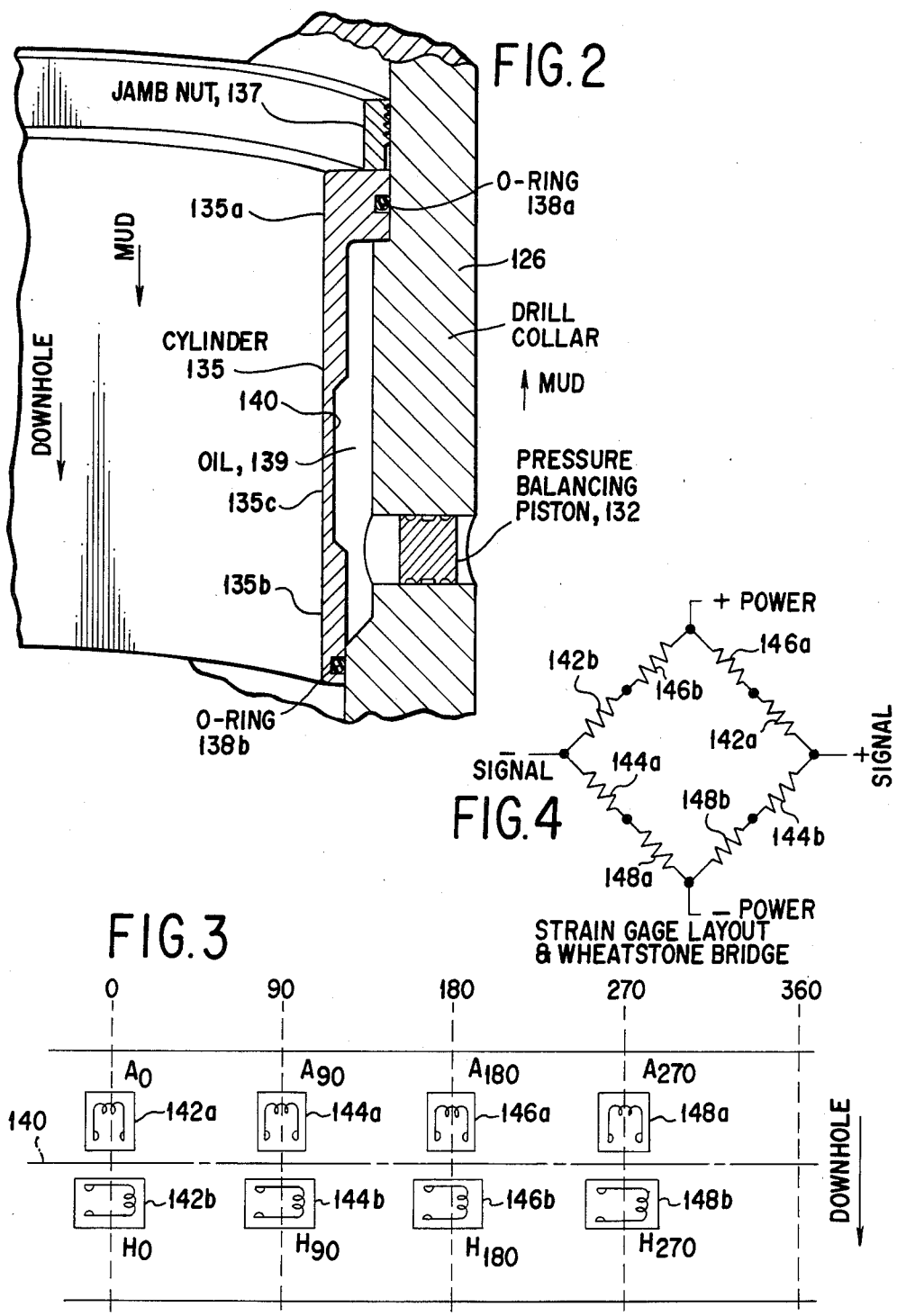

APPARATUS AND METHOD FOR MEASURING DIFFERENTIAL PRESSURE WHILE DRILLING

BACKGROUND OF THE INVENTION

This invention relates generally to apparatus and methods for measuring the differential pressure of fluid internal and external to a pipe, and more particularly to apparatus and methods for measuring the differential pressure between the mud internal to the drill collar and the mud in the borehole external to the drill collar during drilling.

Various measuring-while-drilling (MWD) techniques for telemetering data representing various monitored downhole conditions during the drilling of a well have been suggested. For example, U.S. Pat. Nos. 4,479,564 to Tanguy, 4,100,528 to Bernard et al., 4,103,281 to Strom et al., 3,309,656 (Godbey), 3,820,063 to Sexton et al., and 3,855,857 to Claycomb all disclose MWD systems using phase-shift-keyed (PSK) modulation for monitoring such useful conditions as direction of the hole, weight on bit, bit torque, temperature, natural gamma radiation, formation resistivity, and the predicted drill bit path. Another downhole condition, the monitoring of which is particularly useful to the driller is the differential pressure between the mud internal and external to the drill collar. The differential pressure may be used for monitoring surge and swab. Likewise, the differential pressure may be used for determining whether gas or liquid has intruded into the borehole such that the potential of a blowout exists, or whether fluids or sand are being forced into the formation such that hydrocarbon production could be jeopardized due to formation damage. Further, differential pressure may be used as an indication of the bit nozzle conditions and of drill collar washouts.

Apparatus and methods for measuring differential pressure are known in the art. Typically, two pressure transducers are used, with a first pressure transducer measuring the internal (drill collar) pressure and a second pressure transducer separately measuring the external (annulus or borehole) pressure. Such an arrangement is seen in one embodiment of U.S. Pat. No. 4,297,880 to E. Berger. Among the many problems of the two pressure transducer arrangement is that resolution is poor because the two transducers must a have large full scale (0 to 22,000 psi) to obtain a differential pressure of a much smaller full scale (0 to 5000 psi). Thus, two big values are being subtracted to obtain a small value. In addition, the cost, packaging, and reliability of the two transducer arrangement is disadvantageous.

While a single pressure transducer arrangement for measuring differential pressure is suggested by second embodiments (FIGS. 3 and 4) of the aforementioned Berger U.S. Pat. No. 4,297,880, it will be appreciated that such an arrangement has various disadvantages. A first disadvantage is the possibility of inaccurate measurement due to axial and torque forces on the tool and the application of the mud at orthogonal angles to the transducer. In addition, the Berger arrangement causes the transducer to be directly subjected to both the internal and external mud and could result in undesired mud leakage which could cause tool failure and/or could interfere with the MWD signal.

Of further interest for its geometry is the aforementioned Claycomb U.S. Pat. No. 3,855,857 which has a thin-walled sleeve having a reduced diameter mid-portion. The apparatus disclosed by Claycomb, however, is particularly arranged to measure axial forces on the drill bit and not the differential mud pressure. In fact, as indicated in Col. 6 line 57 through Col. 7, line 38, of the Claycomb patent, care is taken to isolate the pressure transducer from the mud so that the mud pressure will not affect the desired measurements.

Given the tools of the art, it will be appreciated that an accurate and simple differential pressure measurement arrangement for an MWD tool would be most desirable.

SUMMARY OF THE INVENTION

It is therefore an object of the invention to provide an apparatus and method for directly measuring the differential pressure of drilling mud internal and external to a drill string with a single pressure transducer.

It is another object of the invention to provide a differential pressure apparatus which is integral to a MWD tool mandrel.

In accord with the preferred invention, the apparatus for measuring differential pressure of mud internal a drill string and mud in the borehole annulus, comprises:

(a) a load bearing body adapted as part of a drill string, with the load bearing body including a pressure balancing piston in hydraulic contact with the mud external to the load bearing body;

(b) a cylinder having a first end portion arranged to be in contact with the inside of said load bearing body and supported by said load bearing body, a second end portion arranged to be in contact with the inside of said load bearing body, and a middle section arranged to be set off from the inside of said load bearing body such that a gap is formed between said middle portion of the cylinder and the load bearing body, said cylinder being in contact with said mud internal said load bearing body;

(c) a fluid filling the gap formed between the cylinder and the load bearing body, wherein said pressure balancing piston is in hydraulic contact with the gap-filling fluid;

(d) at least one axially and one circumferentially oriented deformation measurement means disposed in proximity to each other along the middle portion of the cylinder, wherein the at least one axially oriented deformation measurement means provides an axial deformation measurement and the at least one circumferentially oriented deformation measurement means provides a hoop deformation measurement; and (e) means for obtaining the axial and hoop deformation measurements, and for providing pressure determinations representing the difference of pressure between the mud inside the drill string and the mud in the borehole annulus as a linear function of the difference of axial and hoop deformations.

Preferably, the provided cylinder is shaped with thicker end portions and a relatively thin middle portion. In fact, in order to increase sensitivity, a section of the middle portion on which the strain gauges are located may be made very thin. Also preferably, the shaped cylinder is held in engagement with the drill collar (load bearing body) by means of a jamb nut, and O-rings are utilized to prevent leaks between the oil filling the gap and the mud inside the drill collar. Further, in order to eliminate bending moment effects, at least two and preferably four axially oriented and circumferentially oriented strain gauges are arranged around the cylinder. The means for obtaining the measurements and providing a differential pressure measurement therefrom is a Wheatstone Bridge having the axial gauges of 0 and 180 degrees as resistors on one leg, and axial gauges of 90 and 270 degrees as resistors on the opposite leg, with hoop gauges of 0 and 180 degrees as resistors on a third leg, and 90 and 270 degrees as resistors on the leg opposite the third leg. Such a circuit is easily arranged as the differential pressure is a linear function of hoop minus axial stress, and stress is equal to strain times a coefficient of elasticity.

In accord with the method invention, a method for obtaining a differential pressure measurement basically comprises: using the apparatus summarized above to obtain hoop and axial stress measurements at ninety degree intervals around the thin midsection of the cylinder; eliminating bending moment effects by configuring the strain gauges of the apparatus in a Wheatstone bridge to provide axial and hoop stress measurements which average out the bending moment; and obtaining differential pressure determinations by taking the difference of the hoop and axial stresses.

Other objects, features, and advantages of the invention will become apparent to those skilled in the art upon reference to the following detailed description of the invention and the accompanying drawings.

BRIEF DESCRIPTION OF THE DRAWINGS

FIG. 2 is an enlarged detailed partial cross-sectional view of the differential pressure measurement apparatus of the system of FIG. 1;

FIG. 3 is a diagrammatic view of the strain gauge layout along axis 3—3 of FIG. 2; and FIG. 4 is an electrical circuit indicating the preferred connections of the strain gauges for providing differential pressure determinations.

DETAILED DESCRIPTION OF THE PREFERRED EMBODIMENTS

Figure 1:
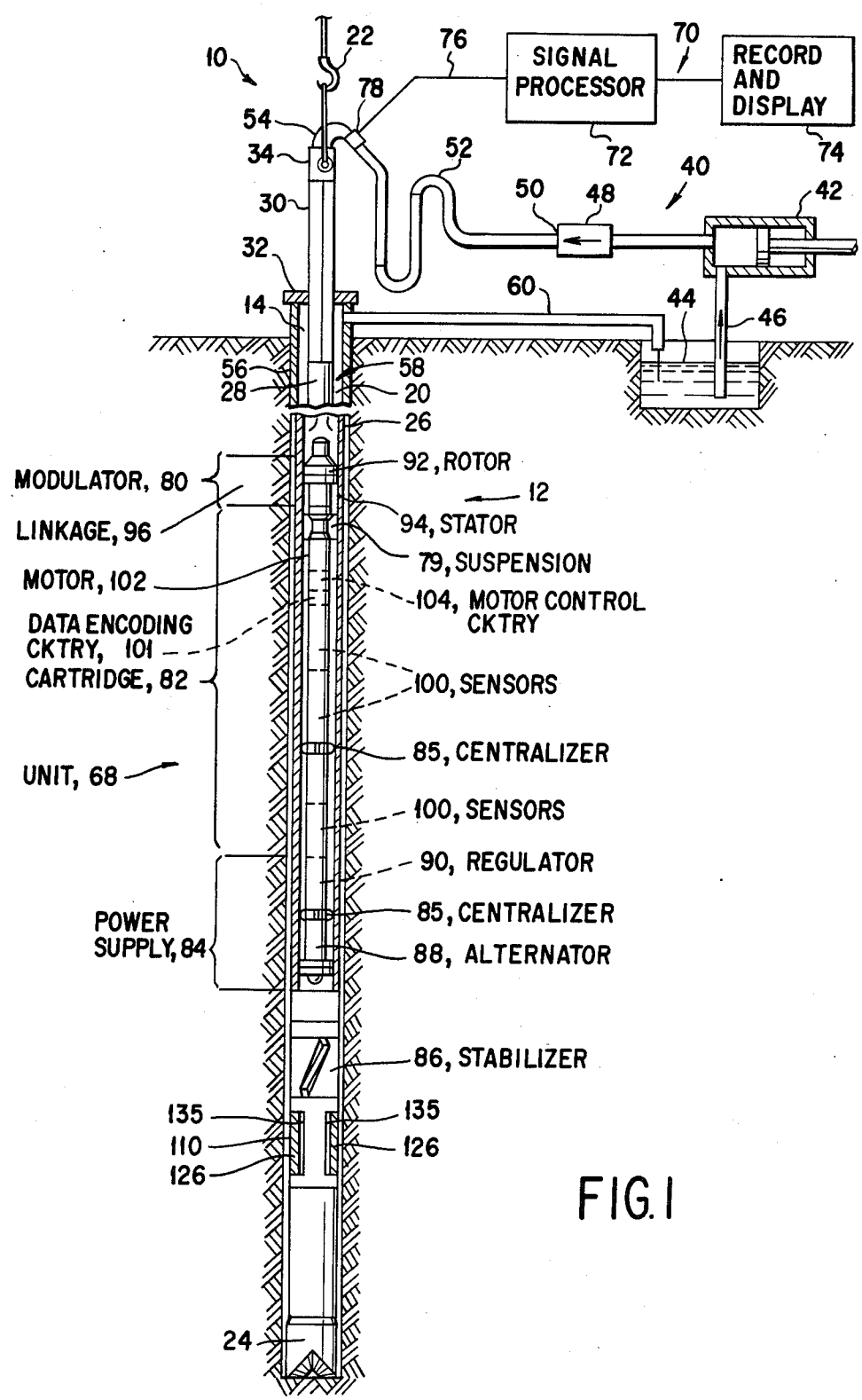
FIG. 1 is a schematic drawing showing a generalized well drilling and data measuring system utilized by the invention.

Turning to FIG. 1, a drilling system 10 is shown in conjunction with a measuring and telemetering system 12. The system 12 is preferably a MWD system of the type described in U.S. Pat. Nos. 4,100,528 and 4,103,281 although other types of systems may be utilized.

As the drilling system 10 drills a well-defined borehole 14, the system 12 senses downhole conditions within the well and generates an acoustic signal which is modulated according to data generated to represent the downhole conditions. In the preferred and illustrated embodiment, the acoustic signal is imparted to drilling mud which carries the signal to the surface of the borehole 14. At or near the surface of the borehole 14, the acoustic signal is detected and processed to provide recordable data representative of the downhole conditions in accord with the system described in U.S. Pat. No. 3,309,656 to Godbey.

The drilling system 10 is conventional and includes a drill string 20 and a supporting derrick (not shown) represented by a hook 22 which supports the drill string 20 within the borehole 14. The drill string 20 includes a bit 24, one or more drill collars 26, and a length of drill pipe 28 extending into the borehole. The pipe 28 is coupled to a kelly 30 which extends through a rotary drive mechanism 32. For "rotary" drilling, actuation of the rotary drive mechanism 32 (by equipment not shown) rotates the kelly 30 which in turn rotates the drill pipe 28 and the bit 24. For "directional" drilling, kelly 30 is held against rotation and a downhole motor (not shown) is provided to rotate the bit. The kelly 30 is supported by the hook via a swivel 34.

Positioned near the entrance of the borehole 14 is a conventional drilling fluid circulating system 40 which circulates the mud downwardly into the borehole 14. The mud is circulated downwardly through the drill pipe 28 during drilling, exits through jets in the bit 24 into the annulus and returns uphole where it is received by the system 40. The circulating system 40 includes a mud pump 42 coupled to receive the mud from a mud tank 44 via a length of tubing 46. A desurger 48 is coupled to the exit end of the mud pump 42 for removing any surges in the flow of the mud from the pump 42, thereby supplying a substantially continuous flow of mud at its output orifice 50. A mud line 52 couples the output orifice 50 of the desurger to the kelly 30 via a gooseneck 54 coupled to the swivel 34.

Mud returning from downhole exits near the mouth of the borehole 14 from an aperture in a casing 56 which provides a flow passage 58 between the walls of the borehole 14 and the drill pipe 28. A mud return line 60 transfers the returning mud from the aperture in the casing 56 into the mud pit 44 for recirculation.

The system 12 includes a downhole acoustic signal generating unit 68 and an uphole data receiving and decoding system 70. The acoustic signal generating unit 68 senses the downhole conditions and imparts a modulated acoustic signal to the drilling fluid. The acoustic signal is transmitted by the drilling fluid to the uphole receiving and decoding system 70 for processing and display.

To this end, the receiving and decoding system 70 includes a signal processor 72 and a record and display unit 74. The processor 72 is coupled by a line 76 and one or more pressure transducers 78 to the mud lines 52. The modulated acoustic signal transmitted uphole by the drilling fluid is monitored by the transducer 78 which in turn generates electrical signals to the processor 72. These electrical signals are decoded into meaningful information representative of the downhole conditions, and the decoded information is recorded and displayed by the unit 74. One such uphole data receiving and decoding system 70 is described in U.S. Pat. No. 3,886,495 to Sexton et al.

The downhole acoustic signal generating unit 68 is supported within one or more of the downhole drill collars 26 by suspension mechanism 79 and generally includes a modulator 80 having at least part of the flow of the mud passing through it. The modulator 80 is controllably driven for selectively modifying the flow of the drilling fluid to thereby impart the acoustic signal to the mud. A cartridge 82 is provided for sensing various downhole conditions and for driving the modulator 80 accordingly. The generating unit 68 also includes a power supply 84 for energizing the cartridge 82. A plurality of centralizers 85 are provided to position the modulator 80, the cartridge 82 and the supply 84 centrally within the collar 26. One or more stabilizers 86 are provided for supporting and stabilizing the drill collars during drilling.

The power supply 84 may be of a design known in the art and includes a turbine positioned within the flow of the drilling fluid to drive the rotor of an alternator 88. A voltage regulator 90 regulates the output voltage of the alternator 88 to a proper value for use by the cartridge 82.

Suitable designs for the modulator 80 are also now known in the art. Modulator 80 preferably includes a movable member in the form of a rotor 92 which is rotatably mounted on a stator 94. At least part of the flow of the mud passes through apertures in the rotor 92 and in the stator 94 and rotation of the rotor selectively modifies flow of the drilling fluid when the apertures are in misalignment thereby imparting the acoustic signal to the drilling fluid. A motor 102 is coupled to gear reduction drive linkage 96 which drives the rotor. The cartridge 82 is operably connected to the linkage 96 for rotating the rotor 92 at speeds producing an acoustic signal in the drilling fluid having a substantially constant carrier frequency which defines a reference phase value, and a selectively produced phase shift relative to the reference phase value at the carrier frequency. The phase shift is indicative of encoded data values representing the measured downhole conditions.

In the preferred embodiment the drive linkage 96 and the designs of the rotor 92 and stator 94 are chosen to generate five or six carrier cycles in the acoustic signal for each revolution of the rotor 92. A suitable modulator 80 is shown and described in detail in U.S. Pat. No. 3,764,970 to Manning.

Referring now to the cartridge 82, it includes one or more sensors 100 and associated data encoding circuitry 101 for measuring the downhole condition and generating encoded data signals representative thereof. For example, the sensors 100 may be provided for monitoring drilling parameters such as the direction of the hole (azimuth of hole deviation), weight on bit, torque, etc. The sensors 100 may be provided for monitoring safety parameters, such as used for detecting over pressure zones (resistivity measurements) and fluid entry characteristics by measuring the temperature of the drilling mud within the annulus 58. Additionally, radiation sensors may be provided, such as gamma ray sensitive sensors for discriminating between shale and sand and for depth correlation. Sensors may also be provided for detecting bending moment applied to a lower portion of the drill string as is described in U.S. Pat. No. 4,479,564. Further, as will be explained, a differential pressure sensor may be provided to determine the difference in pressure between the drilling mud located internal and external to a drill collar 26.

The data encoding circuitry 101 is of the conventional type and may include a multiplex arrangement for encoding the signals from the sensors into binary code and then serially transmitting them over a data line. A suitable multiplex encoder arrangement is disclosed in detail in U.S. Pat. No. 3,820,063 to Sexton. The cartridge 82 may also include motor control circuit 104 for controlling the speed of the motor 102 for rotating the rotor 92 of the modulator 80 at the proper speeds to effect the desired acoustic signal generator. The motor 102 can be a two or three phase AC induction motor which is driven at sixty Hz by the motor control circuitry 104. Use of an induction motor for the motor 102 is not critical, as other types of motors could be used.

In accord with the invention, the differential pressure measuring apparatus 110 is preferably located in the drill string between the drill bit 24 and the alternator 88. As seen in detail in FIG. 2, the differential pressure measuring apparatus 110 includes a load bearing body 126 which may comprise a section of the drill collar 26. The load bearing body 126 includes a pressure balancing piston 132 which is in hydraulic contact with the mud in the borehole annulus. The differential pressure measuring apparatus 110 further includes a shaped cylinder 135 having sections 135a, 135b, and 135c, a jamb nut 137, O-rings 138a and 138b, oil 139, and a plurality of strain gauges 142a, 142b, 144a, 144b, 146a, 146b and 148a and 148b as seen in FIG. 3.

As indicated in FIG. 2, the cylinder 135 may be preloaded against the drill collar 26 by a jamb nut 137, although it will be recognized by those skilled in the art that while downhole the cylinder typically will be loaded against the drill collar due to differential pressure forces. The shaped cylinder 135 includes relatively thick end portions 135a and 135b, and a relatively thinner middle portion 135c on which the strain gauges are placed. The actual lengths and thicknesses of the sections of the shaped cylinder 135 are not critical provided the forces along the thinner middle portion 135c are substantially hoop (circumferential) and axial stresses only, and that the end conditions of the cylinder do not affect the forces on the thinner middle section 135c. Indeed, the cylinder 135 may be of relatively uniform thickness, as a reduced thickness (thin) middle portion is provided primarily for sensitivity purposes. It is of note that with the provided shaped cylinder 135, the upper thicker end 135a is arranged to hang from the drill collar portion 125 while the lower thicker end 135b is not rigidly attached or fixed to the drill collar. In this manner, weight on bit forces and torque are decoupled from the cylinder 135 such that only axial and hoop stress due to the mud inside and outside the drill collar affect the thinner portion 135i c of the cylinder.

The shaped cylinder 135 is also arranged to be in contact with the inside of the drill collar such that the shaped cylinder is in contact with the mud internal to the drill string and such that a gap is formed between at least the relatively thinner middle portion 135c of the shaped cylinder and drill collar portion 126 having piston 132. The gap between the cylinder 135 and drill collar portion 126 is filled with a nonconductive fluid 139, preferably nonconductive oil, which becomes pressurized to the annulus pressure due to the piston 132. In other words, because the piston 132 is in hydraulic contact both with the oil 139 in the gap between the shaped cylinder and drill collar and the mud in the borehole annulus, the oil 139 is pressurized to the pressure of the mud in the borehole annulus. Thus, it will be appreciated that on a first side, the shaped cylinder 135 is subjected to the hydraulic pressure of the mud in the borehole annulus, while on a second side, the shaped cylinder 135 is subjected to the hydraulic pressure of the mud within the drill string. It will also be appreciated that in order to prevent leakage of the oil 139 into the mud inside the drill string or vice versa, O-rings 138a and 138b are provided to act as seals.

With the desired forces acting upon opposite sides of the shaped cylinder, a determination of differential pressure is possible. While hoop stresses and axial stresses (or strains) are not functions of differential (delta) pressure, it has been found that hoop stresses minus axial stresses are a function of delta pressure. This may be seen with reference to the following table derived from analysis of a tool substantially as shown in FIGS. 1 and 2:

| Pressures (psi) | | | Stress (psi) | | |
| --- | --- | --- | --- | --- | --- |
| Internal (P$_i$) | Annulus (P$_o$) | ΔP (P$_i$) − (P$_o$) | Hoop σ$_h$ | Axial σ$_d$ | Δσ σ$_n$ − σ$_a$ |
| 20,000 | 15,000 | 5,000 | 30,932 | −39,898 | 70,830 |
| 10,000 | 5,000 | 5,000 | 40,920 | −29,903 | 70,823 |
| 5,000 | 0 | 5,000 | 45,914 | −24,915 | 70,829 |

In fact, it has been found that the hoop minus axial stress varies substantially linearly with the delta pressure.

To obtain a measurement of hoop minus axial stress, a plurality of strain gauges measure strain are axially and circumferentially oriented at approximately ninety degree intervals circumferentially around the "oil side" of the relatively thinner middle portion of the shaped cylinder at an approximate axial position 140. Thus, as indicated in FIG. 3, strain gauges 142a, 144a, 146a, and 148a are oriented axially along the circumference of shaped cylinder 135 at axial location 140 and measure the axial stress. Likewise, strain gauges 142b, 144b, 146b, and 148b and oriented circumferentially along the circumference of shaped cylinder 135 at axial location 140 and measure the hoop stress. By connecting the strain gauges as a Wheatstone bridge 150 as is indicated in FIG. 4, all stresses due to bending moment and local temperature differences may be eliminated and a signal indicative of the pressure differential may be obtained. Thus, gauges 142a and 146a are placed in series between the positive power supply and the positive signal output, while gauges 144a and 148a are placed in series between the negative power supply and the negative signal output. Gauges 142b and 146b are placed in series between the positive power supply and the negative signal output, while gauges 144b and 148b are located in series between the negative power supply and the positive output signal. By subtracting the negative output voltage signal from the positive output voltage signal, a determination of the pressure differential (delta pressure) may be had. The pressure determination (in volts) may then be digitized and sent uphole in accord with system 12 as aforedescribed. Differential pressure may then be determined by comparing the voltage measurements to calibration information regarding the tool. The calibration information may correct for absolute temperature, non-linearity of the gauges, etc. as desired.

Those skilled in the art will appreciate that a method for determining the differential pressure between mud in the borehole and the mud in the drill string is suggested in conjunction with the aforedescribed apparatus. Thus, where a drill collar having a pressure balanced piston is provided, and a shaped cylinder which is in contact with the drill collar and which has thicker end portions and a thinner middle portion is provided with oil being located between the drill collar and the shaped cylinder, the shaped cylinder is arranged relative to the drill collar such that the drill collar will support the shaped cylinder but not transfer vertical forces to the shaped cylinder. This is accomplished by having the upper portion of the shaped cylinder rigidly attached or fixed to the drill collar by means of a jamb nut or the like while the lower portion of the shaped cylinder is not so fixed. Then, with strain gauges located at the thinner middle portion of the shaped cylinder at a given axial location, a delta pressure determination may be had by taking the difference of the hoop and axial stresses measured by the strain gauges. Bending moments which can introduce error into the delta pressure determination may be eliminated by using a plurality of axially and circumferentially disposed gauges at ninety degree intervals around the inner circumference of the shaped cylinder. The differential pressure determination (voltage) may then be codified and sent uphole through mud pulse techniques as aforedescribed. The information may then be decoded and the provided data may be corrected according to calibration data.

There has been described and illustrated herein apparatus and methods for measuring the differential pressure of drilling mud which is internal a drill string and mud which is in the borehole annulus. While particular embodiments of the invention have been described, it is not intended that the invention be limited thereby, as it is intended that the invention be broad in scope and that the specifications be read likewise. Thus, it will be recognized that the underlying concepts of the MWD tool can be used for non-drilling applications. Particularly, the pressure difference between fluid internal and external a pipe may be measured by locating the strain gauges on the surface of the pipe and taking the difference between the hoop and axial stress at a particular location along the pipe. To increase sensitivity, the section of the pipe on which the strain gauges are located may be arranged to be thinner than the other sections of the pipe. With such an arrangement, quality differential pressure measurements may be had, particularly for non-conductive fluids in non-load bearing pipes. Where bending and thermal effects are present, however, the distribution of strain gauges measuring hoop and axial strain over the circumference of the pipe can provide necessary correction.

It will further be appreciated that while a MWD apparatus was described as having a shaped cylinder supported by a load bearing body where a section of the cylinder was subjected to the mud pressures both internal to the drill string and in the borehole, it will be appreciated that the shaped cylinder could comprise an inner mandrel which is modified in shape so as to include a relatively thin middle portion on which the gauges are located. It will also be understood that the shaping of the cylinder is primarily for sensitivity purposes, and that the cylinder could take most any shape provided a fluid-tight gap is created between it and the load bearing body which supports it. Moreover, it will be appreciated that while the apparatus of the invention was described as including eight strain gauges located at ninety degree intervals circumferentially substantially around a single axial location, if desired, fewer or more strain gauges or other strain or stress measurement means could be supplied. Indeed, if desired, the stress or strain measurement means could be supplied at a plurality of axial locations along the cylinder. Also, with regard to the measurement of stress or strain, it will be recognized that because stress and strain are related by the modulus of elasticity, that where a single object is being measured (i.e. only one modulus of elasticity is involved), the differential pressure may be expressed as a linear function of the differences of either the axial and hoop stresses or their related strains. In fact, it should be recognized that it is the deformation of the pipe and hence the gauges located thereon which provides that which to measure. Thus, it will be appreciated that it is deformation measurement means which measure axial and hoop deformation whch are required by the invention, and that deformation measurement means include stress or strain measurement means such as strain gauges.

Further yet, it will be recognized by those skilled in the art that while the invention was described as using a piston to transfer the pressure of the annulus to the fluid filling the gap between the thin middle portion of the shaped cylinder and the load bearing body, other pressure transfer means such as a bellows or the like could be utilized in a piston-like manner, and for purposes herein shall be considered a "piston". Moreover, it should be appreciated that while a Wheatstone bridge configuration was shown as the means for obtaining axial and hoop deformation (strain) measurements, the difference of which (as stress or strain values) could be taken to provide an indication of differential pressure, other means would suggest themselves to those skilled in the art to accomplish the same. For example, the strain values could be taken directly to provide the desired measurements. Therefore, it will be apparent to those skilled in the art that other changes and modifications may be made to the invention as described in the specification without departing from the spirit and scope of the invention as so claimed.

I claim:

1. An apparatus for measuring the difference of pressure of fluids internal and external a pipe, comprising:
   (a) first means disposed along said pipe for detecting axial deformation of said pipe and for generating a first signal representative thereof;
   (b) second means disposed along said pipe in proximity to said first means, for detecting hoop deformation of said pipe and for generating a second signal representative thereof;
   (c) means responsive to said first and second signals for providing pressure determinations representing the difference of pressure between the fluids internal and external the pipe as a substantially linear function of the difference of said first and second signals.

2. An apparatus according to claim 1, wherein:
said first means comprises at least two axially oriented deformation measurement means located at one hundred and eighty degrees from each other around said pipe and said second means comprises at least two circumferentially oriented deformation measurement means located at one hundred and eighty degrees from each other around said pipe.

3. An apparatus according to claim 1, wherein:
said first and second means comprise four axially oriented strain gauges located at ninety degree intervals around said pipe and four circumferentially oriented strain gauges located at ninety degree intervals around said pipe respectively, and
said means responsive to first and second signals comprises a Wheatstone bridge having a positive and negative power supply and positive and negative outputs, wherein a first set of axially oriented strain gauges which are located one hundred and eighty degrees apart around said pipe are electrically placed in series between the positive power supply and the positive signal output, and a second set of axially oriented strain gauges which are located one hundred and eighty degrees apart around said pipe are electrically placed in series between the negative power supply and the negative signal output, and wherein a first set of circumferentially oriented strain gauges which are located one hundred and eighty degrees apart around said pipe are electrically placed in series between the positive power supply and the negative signal output, while a second set of circumferentially oriented strain gauges which are located one hundred and eighty degrees apart around said pipe are electrically placed in series between the negative power supply and the positive output signal,
wherein the difference between the positive and negative signal output provides an indication of pressure difference substantially free of bending moments and thermal effects.

4. An apparatus for measuring differential pressure of mud internal a drill string and mud in a borehole annulus, comprising:
   (a) a load bearing body adapted as part of a drill string, with the load bearing body including a pressure balancing piston in hydraulic contact with the mud external to the load bearing body;
   (b) a cylinder having a first end portion arranged to be in contact with the inside of said load bearing body and supported by said load bearing body, a second end portion arranged to be in contact with the inside of said load bearing body, and a middle section arranged to be set off from the inside of said load bearing body such that a gap is formed between said middle portion of the cylinder and the load bearing body, said cylinder being in contact with said mud internal said load bearing body;
   (c) a fluid filling the gap formed between the cylinder and the load bearing body, wherein said pressure balancing piston is in hydraulic contact with the gap-filling fluid;
   (d) at least one axially and one circumferentially oriented deformation measurement means disposed in axial proximity to each other along the middle portion of the cylinder, wherein the at least one axially oriented deformation measurement means provides a measurement of axial deformation and the at least one circumferentially oriented deformation measurement means provides a measurement of hoop deformation; and
   (e) means for obtaining said axial and hoop deformation measurements from the axially and circumferentially oriented deformation measurement means, and for providing pressure determinations representing the difference of pressure between the mud inside the drill string and the mud in the borehole annulus as a substantially linear function of the difference of said measurements.

5. An apparatus according to claim 4, further comprising:
   (f) fluid sealing means between said cylinder and said load bearing body to prevent said fluid from leaking out of said gap and to prevent said mud inside said drill string from entering said gap, wherein said second end portion of said cylinder is arranged to be unfixed in axial position relative to said load bearing body.

6. An apparatus according to claim 5, further comprising:
   (g) preloading means for forcing said cylinder into contact with said load bearing body such that said fluid sealing means is effective in preventing fluid leakage.

7. An apparatus according to claim 5, wherein:
said fluid is nonconducting oil, and said axial and circumferentially oriented deformation measurement means are located on the surface of said shaped cylinder in contact with said oil.

8. An apparatus according to claim 5, wherein: said at least one axially and one circumferentially oriented deformation means comprises at least two axially oriented deformation measurement means located at one hundred and eighty degrees from each other around said middle portion of said cylinder and at least two circumferentially oriented deformation measurement means located at one hundred and eighty degrees from each other around said middle portion of said cylinder.

9. An apparatus according to claim 8, wherein: said at least one axially and one circumferentially oriented deformation measurement means includes four axially oriented deformation measurement means located at ninety degree intervals around said middle portion of said cylinder and four circumferentially oriented deformation measurement means located at ninety degree intervals around said middle portion of said cylinder.

10. An apparatus according to claim 9, wherein: said deformation measurement means are strain gauges.

11. An apparatus according to claim 9, wherein: said means responsive to first and second signals comprises a Wheatstone bridge having a positive and negative power supply and positive and negative outputs, wherein a first set of axially oriented strain gauges which are located one hundred and eighty degrees apart around said pipe are electrically placed in series between the positive power supply and the positive signal output, and a second set of axially oriented strain gauges which are located one hundred and eighty degrees apart around said pipe are electrically placed in series between the negative power supply and the negative signal output, and wherein a first set of circumferentially oriented strain gauges which are located one hundred and eighty degrees apart around said pipe are electrically placed in series between the positive power supply and the negative signal output, while a second set of circumferentially oriented strain gauges which are located one hundred and eighty degrees apart around said pipe are electrically placed in series between the negative power supply and the positive output signal, wherein the difference between the positive and negative signal output provides an indication of pressure difference substantially free of bending moments and thermal effects.

12. An apparatus according to claim 11, wherein: said cylinder is a shaped cylinder having relatively thicker end portions and a relatively thinner middle portion.

13. An apparatus according to claim 12, wherein: said fluid is nonconducting oil, and said strain gauges are located on the surface of said cylinder in contact with said oil.

14. An apparatus according to claim 5, wherein: said load bearing body is a drill collar.

15. An apparatus according to claim 5, wherein: said cylinder is a shaped cylinder having relatively thicker end portions and a relatively thinner middle portion.

16. An apparatus according to claim 15, wherein: said shaped cylinder is an inner mandrel of a measurement while drilling tool.

17. A method for measuring the difference in pressure of fluids flowing internal and external a pipe, comprising:
(a) placing on said pipe at least a first deformation measurement means in an axial orientation, and in proximity to said first deformation measurement means at least a second deformation measurement means in a circumferential orientation;
(b) generating a first signal representative of the axial deformation of said pipe and a second signal representative of the hoop deformation of said pipe when said fluids are flowing internal and external said pipe;
(c) determining the difference in pressure between said fliuids flowing internal and external said pipe as a linear function of said generated first and second signals.

18. A method according to claim 17, wherein: said determining step further comprises
(1) prior to determining the difference in pressure between said fluids, caibrating said pipe with said deformation means placed thereon to provide a means for calibrating a determined pressure difference, and
(2) processing a determination of pressure difference made from said linear function of said first and second signals by said means for calibration, to obtain a true pressure difference determination.

19. A method according to claim 17, wherein: said placing step further comprises placing at least one set of two axially oriented deformation measurement means located at one hundred and eighty degrees from each other around said pipe and at least one set of two circumferentially oriented deformation measurement means located at one hundred and eighty degrees from each other around said pipe,
said generating step further comprises generating signals from each of said deformation means, and
said determining step further comprises determining the pressure difference substantially free from bending moments and thermal effects from a linear function of the generated signals from each of the deformation means.

20. A method according to claim 17, where said fluids are drilling mud located within a drill string and drilling mud located in a borehole annulus, further comprising;
placing in said borehole an apparatus as part of said drilling string, wherein said apparatus includes said pipe which is comprised of a cylinder having a portion which is sensitive to and deformed substantially only by both said drilling mud located within said drilling string and said drilling mud located in said borehole annulus, but is free from the axial forces of said drilling string, said portion having said deformation measurement means thereupon; wherein
said determining step further comprises determining the difference in pressure continuously during drilling of said borehole.

21. A method according to claim 20 wherein said apparatus includes at least four axially oriented deformation measurement means located at ninety degree intervals around said sensitive portion of said cylinder and at least four circumferentially oriented deformation measurement means located at ninety degree intervals around said sensitive portion of said cylinder, further comprising:

providing positive and negative power supplies, and electrically arranging said deformation measurement means and said power supplies such that a first set of axially oriented deformation measurement means which are located one hundred and eighty degrees apart around said cylinder are electrically placed in series between the positive power supply and a positive signal output, a second set of axially oriented deformation measurement means which are located one hundred and eighty degrees apart around said cylinder are electrically placed in series between the negative power supply and a negative signal output, a first set of circumferentially oriented deformation measurement means which are located one hundred and eighty degrees apart around said cylinder are electrically placed in series between the positive power supply and the negative signal output, and a second set of circumferentially oriented deformation measurement means which are located one hundred and eight degrees apart around said cylinder are electrically pleaced in series between the negative power supply and the positive signal output.

22. A method according to claim 21, wherein:
said first and second signals of said generating step are obtained from said positive and negative signal output.

23. A method according to claim 22, wherein:
said determining step further comprises
(1) prior to determining the difference in pressure between said fluids, calibrating said apparatus with said deformation means placed thereon to provide a means for calibrating a determined pressure difference, and
(2) processing a determination of pressure difference made from said linear function of said first and second signals by said means for calibration, to obtain a true pressure difference determination.

* * * * *